United States Patent Office 3,803,094
Patented Apr. 9, 1974

3,803,094
PROCESS FOR PRODUCING FORMALDEHYDE COPOLYMER
Takami Ishii, Ichihara, Naohisa Takikawa, Ube, and Yoshihiro Inuizawa, Ichihara, Japan, assignors to Ube Industries, Ltd., Ube-shi, Yamaguchi-ken, Japan
No Drawing. Filed July 12, 1972, Ser. No. 270,930
Int. Cl. C08g 1/16
U.S. Cl. 260—67 FP
9 Claims

ABSTRACT OF THE DISCLOSURE

A process for reproducing a formaldehyde-cyclic ether copolymer having a high molecular weight and improved thermal stability is described. Formaldehyde and cyclic ether are copolymerized in an inert organic solvent in the presence of a reaction mixture of a metal chelate compound with Lewis acid.

This invention relates to a process for producing a formaldehyde copolymer having improved thermal stability wherein formaldehyde and cyclic ether are copolymerized in the presence of a specific catalyst.

Heretofore, several catalysts have been proposed for copolymerizing formaldehyde with cyclic ether. These include for example basic compounds such as triethylamine and pyridine, acidic compounds such as sulfuric acid and boron trifluoride, and a reaction product prepared by contacting an organometallic compound of a metal of Group II, III or VIb of the Periodic Table with carbon dioxide.

However, copolymers formed through the use of such catalysts have low molecular weight and poor thermal stability. More particularly, the acidic compound catalyst results in a formaldehyde copolymer of low molecular weight and poor thermal stability both being insufficient for the practical use. The basic compound and the reaction product prepared by contacting an organometallic compound of a metal of Group II, II or VIb of the Periodic Table with carbon dioxide results in formaldehyde copolymers having a low molecular weight and poor base stability but being capable of being put to practical use. The term "base stability" as used herein is a measure of to what extent the formaldehyde copolymer possessses unstable portions consisting of oxymethylene recurring units at both ends of the polymer chain. The lower the base stability, the more the unstable end parts. When a suitable amount of cyclic ether in the present invention is incorporated in the copolymer chain, the copolymer has a fairly high base stability. In contrast, a homopolymer of formaldehyde has a base stability of zero. The procedure for determining the base stability will be set forth hereinafter.

It has also been proposed to treat polyoxymethylene, i.e. with homopolymer of formaldehyde, with cyclic ether in a liquid medium containing Lewis acid to produce a copolymer having the same composition as that of the formaldehyde copolymer set forth above. This process is however disadvantageous because the following two steps are necessary for the production of the formaldehyde copolymer; first, polymerizing formaldehyde to produce polyoxymethylene and secondly, treating the polyoxymethylene with a cyclic ether to incorporate the cyclic ether units into the oxymethylene main chain. The process, therefore, requiring a more complicated operation and is more costly.

Therefore, it is an object of the present invention to provide a formaldehyde copolymer having a moderate molecular weight and good thermal stability.

Another object of the present invention is to provide a process for producing a formaldehyde copolymer which is advantageous because of simplicity and low cost.

In accordance with the present invention a process is provided for producing a formaldehyde copolymer which comprises copolymerizing substantially anhydrous formaldehyde with a cyclic ether of the formula:

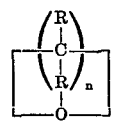

(I)

wherein the R's are identical with or different from each other and selected from the group consisting of a hydrogen atom, an alkyl group having 1 to 3 carbon atoms, an alkenyl group having 2 to 3 carbon atoms and an aryl group having 6 to 8 carbon atoms; and $n$ is an integer of 2 to 6, or the formula:

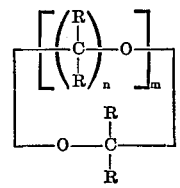

(II)

wherein the R's are identical with or different from each other and the same as the R's defined above in Formula I, and $n$ and $m$ are integers of 2 to 6 and 1 to 3, respectively, in an inert organic solvent in the presence of a reaction mixture of a metal chelate compound with Lewis acid.

The term "substantially anhydrous formaldehyde" as used herein means formaldehyde containing no or at most 1% by weight of impurities, such as water, formic acid and the like. Substantially anhydrous formaldehyde can be prepared from known formaldehyde sources, for example, by the purification of formaldehyde obtained by distillation of formalin or by the heat decomposition of hemi-formal, paraformaldehyde, α-polyoxymethylene or the like.

The catalyst used in the process of the present invention is characterized as a reaction mixture obtained by reacting a metal chelate compound and a Lewis acid with each other.

The Lewis acid includes, for example, boron trifluoride and metal halides such as aluminum trichloride, vanadium trichloride, vanadium oxychloride, phenyltin trichloride, tin tetrachloride, tin tetrabromide, ferric chloride, titanium tetrachloride, zinc chloride, antimony trichloride, antimony pentachloride, antimony trifluoride, antimony pentafluoride, antimony triiodide and the like. Besides these compounds, the following organic boron fluoride complexes are also included: boron trifluoride ether complexes such as boron trifluoride diethyl etherate, boron trifluoride dimethyl etherate, boron trifluoride diisopropyl etherate, boron trifluoride ethyl phenyl etherate, boron trifluoride tetrahydrofuranate, boron trifluoride dioxanate, boron trifluoride dioxolanate and the like; boron trifluoride ester complexes such as boron trifluoride formic ethylate, boron trifluoride acetic ethylate, boron trifluoride acetic methylate, boron trifluoride acetic benzoate, boron trifluoride acetic benzoic ethylate, boron trifluoride acetoacetic ethylate and the like; boron trifluoride ketone complexes such as boron trifluoride monochloroacetonate, boron trifluoride acetylacetonate, boron trifluoride benzoylacetonate, boron trifluoride dibenzoylacetonate, boron trifluoride acetonate and the like; boron trifluoride acid anhydride complexes such as boron trifluoride acetic anhydrate, boron trifluoride propionic anhydrate, boron trifluoride phthalic anhydrate and the like; boron trifluoride alcohol complexes or phenol complexes such as boron trifluoride methanolate, boron trifluoride ethanolate and boron trifluoride phenolate; boron trifluoride organic acid complexes such as boron trifluoride formirate, boron trifluoride acetirate and the like; and boron tetrafluoride alkyloxonium compounds such as boron tetrafluoride triethyloxonium, boron tetrafluoride tri-n-butyloxonium and the like.

A metal chelate compound used for the preparation of the catalyst of the present invention consists of a metal, as a central atom, selected from metals of Groups I, II and III of the Periodic Table and transition metals and a compound, as ligand, known per se as a chelate-forming compound.

The metal includes for example lithium, sodium, potassium, aluminum, copper, zinc, cobalt, iron, nickel, thorium, manganese, molybdenum, vanadium, chrome, titanium, magnesium, cadmium and the like.

The chelate-forming compound includes for example β-diketones such as acetylacetone, 3-methylacetylacetone, 3-ethylacetylacetone, 3-anisacetylacetone, 3-phenylacetylacetone, 3-naphthylacetylacetone, 3-benzylacetylacetone, 3-naphthomethylacetylacetone, 3-allylacetylacetone, 3-methoxyacetylacetone, 3-ethoxyacetylacetone, 3-benzoylacetylacetone, propionylacetone, benzoylacetone, dibenzoylacetone, naphthoylacetone, 5-dimethyl - 4 - heptenoylacetone, methoxycarbonylacetone, ethoxycarbonylacetone, thenoylacetone, furoylacetone, trifluoroacetylacetone, dichloroacetylacetone, bromobenzoylacetone, iodoacetylacetone and the like; thio-β-diketone such as monothioacetylacetone, dithioacetylacetone and the like; aromatic hydroxyaldehydes such as salicylaldehyde, 5-methylsalicylaldehyde, 3 - chlorosalicylaldehyde, 4-methoxysalicylaldehyde, 5-sulfosalicylaldehyde, and the like; condensation products between aromatic hydroxyaldehyde and diamine such as bis(salicylaldehyde)ethylenediimine, bis(salicylaldehyde) hexamethylenediimine and the like; dibasic acids such as malonic acid, methylmalonic acid, oxalic acid, succinic acid itaconic acid, and the like; amino acids such as glycine, glutamic acid, phenylalanine and the like; and oximes such as benzoinoxime, dimethylglyoxime and the like; 8-hydroxyquinoline; and ethylenediaminetetraacetic acid.

The catalyst of the present invention can be prepared in the following manner:

Lewis acid and a metal chelate compound both as set forth above are introduced in a solvent and maintained at a temperature of 0° C. to a boiling point of the solvent while being stirred thereby to react with each other. A suitable solvent is at least one selected from saturated hydrocarbons such as n-hexane, n-heptane, etc.; aromatic hydrocarbons such as benzene, toluene, etc.; alicyclic hydrocarbons such as cyclopentane, cyclohexane, etc.; halogenated hydrocarbons such as chloroform, methylene chloride, etc.; and ethers such as diethyl ether.

The proportion of Lewis acid used is preferably 2 to 20 moles per mole of a metal chelate compound in the case of the metal chelate compound being other than bis(3-phenylacetylacetone)copper and 2 to 2,000 moles per mole of the metal chelate compound in the case of the metal chelate compound being bis(3-phenylacetylacetone) copper.

The reaction time is generally 5 minutes to 3 days, although it varies depending upon the particular Lewis acid and metal chelate compound, and the reaction temperature. In general the reaction time can be shortened with a higher reaction temperature. For example, in the case where 5 mmoles of tris(acetylacetone)cobalt and 50 mmoles of boron trifluoride etherate are dissolved in 1 l. of toluene while being stirred, the dependence of the reaction, time, i.e. the time required for the completion of reaction, upon the reaction temperature is shown in Table I.

TABLE I

| Reaction temperature (° C.): | Reaction time (min.) |
|---|---|
| 26 | 120 |
| 60 | 60 |
| 80 | 2 |

As apparent from Table I, approximately 10 minutes would be quite enough at a reaction temperature of 80° C., for example, although the reaction time varies depending upon the reaction temperature.

In some cases, a minor amount of precipitate is formed during the reaction. The formation of the precipitate can be prevented by previously introducing acetic acid anhydride into the reaction mixture in amounts of not less than 4 moles per mole of the metal chelate compound. However, it is preferable not to introduce an excessive amount, e.g. more than 100 moles, of acetic acid anhydride because it results in formaldehyde copolymers of poor base stability.

The reaction mixture between Lewis acid and a metal chelate compound, so prepared, can be employed as a copolymerization catalyst without further processing the reaction mixture.

The amount of the catalyst is, if expressed relative to the amount of formaldehyde to be copolymerized, preferably such that the amount of the Lewis acid used for the preparation of the catalyst is 0.1 to 2.0 mmoles, and the amount of the metal chelate compound used for the preparation of the catalyst is 0.02 to 0.25 mmole in the case of the metal chelate compound being other than bis(3-phenylacetylacetone)copper and 0.0002 to 0.25 mmole in the case of the metal chelate compound being bis(3-phenylacetylacetone)copper, both per mole of formaldehyde.

The amount of the catalyst is, if expressed relative to the amount of an inert organic solvent, preferably such that the amount of the Lewis acid used for the preparation of the catalyst is 0.5 to 2.0 mmoles, and the amount of the metal chelate compound used for the preparation of the catalyst is 0.1 to 0.25 mmole in the case of the metal chelate compound being other than bis(3-phenylacetylacetone)copper and 0.001 to 0.25 mmole in the case of the metal chelate compound being bis(3-phenylacetylacetone) copper, both per litre of the solvent.

A metal chelate compound which is one ingredient used for the preparation of the catalyst of the present invention is known per se as a catalyst for the homopolymerization of formaldehyde, on the one hand.

As set forth hereinbefore, Lewis acid which is the other ingredient used for the preparation of the catalyst of the present invention is known as a catalyst used in a process for treating polyoxymethylene with cyclic ether whereby the cyclic ether unit is inserted in the oxymethylene main chain, on the other hand. The reaction occurring in this process is referred to hereinafter as "insertion reaction" for brevity.

Since the process of the present invention involves the employment of a reaction mixture of the two ingredients, i.e., Lewis acid and a metal chelate compound, as a cataylst for copolymerizing formaldehyde with cyclic ether, the reaction mechanism in the process of the present invention can be inferred at first sight as follows: first formaldehyde is polymerized alone by the one ingredient, i.e., the metal chelate compound, and then, coexisting cyclic ether is inserted in the formaldehyde homopolymer so produced, by the other ingredient, i.e., the Lewis acid whereby a formaldehyde copolymer is formed.

This inference is, however, contrary to the facts, which will be obvious from the following two observations: First, when a metal chelate compound and Lewis acid are employed only in the form of a reaction mixture prepared by reacting the two ingredients with each other in the absence of both monomers of formaldehyde and cyclic ether before introducing the two ingredients into the copolymerization system, a desirable copolymer of a high molecular weight and improved thermal stability is obtainable. In other words, when the two ingredients are separately introduced into the copolymerization system, a copolymer having a low molecular weight and poor thermal stability and being of no practical use is produced, which is similar to that produced when only Lewis acid is employed as catalyst. This fact is illustrated in Comparative Example 3. Such being the case, it is concluded that the two ingredients do not exhibit the catalytic activity independently but rather the reaction mixture between the two ingredients exhibits the catalytic activity.

Secondly, both yield and characteristics of the copolymer gradually change with time throughout the copolymerization in the process of the present invention, as illustrated in the following Reference Example 1.

REFERENCE EXAMPLE 1

Copolymerization of formaldehyde and 1,3-dioxolan was performed under the same conditions as those in Example 1 set out later. The dependence of yield and characteristics of the copolymer on the lapse of time throughout the copolymerization is shown in Table II.

TABLE II

| Time elapsed (min.) | Polymerization temperature (° C.) | Yield (g.) | Characteristics of copolymer ||||
|---|---|---|---|---|---|---|
| | | | Melting point (° C.) | $[\eta]$ | Base stability, percent | $K_{222}$ (percent/min.) |
| 5 | 15 | 73 | 168 | 0.82 | 35 | 0.55 |
| 10 | 50 | 112 | 166 | 1.05 | 60 | 0.50 |
| 20 | 60 | 160 | 166 | 1.37 | 75 | 0.18 |
| 120 | 60 | 245 | 165 | 1.51 | 98 | 0.01 |

As is apparent from Table II, the yield, the melting point, the molecular weight (expressed in terms of the intrinsic viscosity $[\eta]$) and the base stability of the copolymer gradually increase and the rate constant of thermal degradation ($K_{222}$) of the copolymer gradually decreases with time throughout the copolymerization. From these results, it will be readily understood that the copolymerization is performed in a manner such that cyclic ether (i.e., 1,3-dioxolan in the above example) is randomly and gradually incorporated in polymer with progress of the polymerization of formaldehyde whereby a randon copolymer of formaldehyde and cyclic ether is formed.

The above fact will be apparent from the comparison of molecular weight of the copolymer prepared by the process of the present invention and that prepared by the known process involving the utilization of the insertion reaction. This latter process is illustrated in the following Reference Example 2.

REFERENCE EXAMPLE 2

There were introduced 100 g. of polyformaldehyde having an intrinsic viscosity $[\eta]$ of 5 and 20 g. of 1,3-dioxolan into 1 l. of toluene. The mixture was then heated to 60° C. while being stirred, followed by the addition of 2.0 moles of boron trifluoride etherate. The insertion reaction was performed for 30 minutes with the temperature maintained at 60° C. The copolymer so produced was filtered out, washed with acetone and then dried under reduced pressure for 10 hours.

A copolymer having a melting point of 163° C., a base stability of 75% and an intrinsic viscosity $[\eta]$ of 1.30 was obtained with a yield of 100 g.

As illustrated in the above example, when an insertion reaction of 1,3-dioxolan in homopolymer of formaldehyde is carried out in the presence of Lewis acid only, the resulting copolymer has a remarkably reduced molecular weight in comparison with that of the starting homopolymer of formaldehyde. In contrast, when copolymerization of formaldehyde and 1,3-dioxolan is carried out in the presence of the catalyst of the present invention, the resulting copolymer has a molecular weight which increases with an increase of the copolymerization time, as illustrated in Reference Example 1.

Further, the above fact will also be apparent from the dependence of the base stability of the copolymer on the copolymerization time. If polyformaldehyde is first formed and then the insertion reaction of 1,3-dioxolan is carried out in the process of the present invention, the base stability of the resulting copolymer does not vary regardless of length of the copolymerization time. However, the facts are completely otherwise; the base stability of the copolymer gradually increases with time in the copolymerization as illustrated in Reference Example 1. The reason for the gradual increase of the base stability of the copolymer with an increase of the copolymerization time appears to be as follows: Reference Example 1 involves a batch-wise solution polymerization system and the polymerization activity of formaldehyde is greater than that of 1,3-dioxolan. Therefore, at the initial stage of the copolymerization, copolymers rich in oxymethylene units are formed which have unstable oxymethylene end parts and hence are poor in base stability, but, with a progress of the copolymerization, the proportion of 1,3-dioxolan unit in copolymers gradually increases as the concentration of formaldehyde in the copolymerization system decreases.

As seen from the detailed description at the preceding paragraphs, the catalyst used in the process of the present invention, i.e., a reaction mixture between a metal chelate compound and Lewis acid, is quite novel and exhibits a behavior quite different from those of each of the two ingredients and of a mere mixture of the two ingredients in the copolymerization of formaldehyde and cyclic ether, although each ingredient is known as a catalyst for the homopolymerization of formaldehyde or the insertion reaction. Obviously, the present invention provides a remarkably technical advance over the prior arts.

When only the metal chelate compound being one ingredient of the catalyst of the present invention is used as a catalyst for the copolymerization, no copolymer is formed, as illustrated in Comparative Example 2. When only the other ingredient, Lewis acid is used similarly, a copolymer is obtainable which has, however, a low intrinsic viscosity $[\eta]$ and poor base stability and hence, cannot be practically used.

Cyclic ethers to be copolymerized with formaldehyde in the process of the present invention are expressed by the formula:

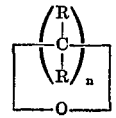

(I)

wherein R's are identical with or different from each other and selected from the hydrogen atom, an alkyl group having 1 to 3 carbon atoms, an alkenyl group having 2 to 3 carbon atoms and an aryl group having 6 to 8 carbon atoms, and $n$ is an integer of 2 to 6, or the formula:

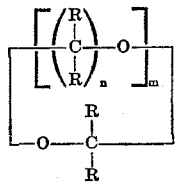

(II)

wherein the R's are identical with or different from each other and the same as the R's defined above in Formula I and $n$ and $m$ are integers of 2 to 6 and 1 to 3, respectively.

The cyclic ethers included in the Formula I includes, for example, ethylene oxide, propylene oxide, butene-1-oxide, 1,3-butadiene-1-oxide, styrene oxide, α-methylstyrene oxide, oxetane, tetrahydrofuran, tetrahydropyran and the like. The cyclic ethers included within the Formula II includes, for example, 1,3-dioxolan, 4-phenyl-1,3-dioxolan, 2-methyl-1,3-dioxolan, 2-phenyl-1,3-dioxolan, 1,3-dioxane, 4-phenyl-1,3-dioxane, 1,4-butanediol formal, 2-butene-1,4-diol formal, styrene glycol formal, diethylene glycol formal, polyethylene glycol formal and the like.

The amount of the cyclic ether fed in the copolymerization with formaldehyde is 0.001 to 1 mole, preferably 0.01 to 0.3 mole, per mole of formaldehyde.

In the practice of the copolymerization of the present invention, both the following methods can be employed. The first is a solution polymerization method wherein formaldehyde is absorbed in a cold solution of the cyclic ether in an inert organic solvent and then the catalyst is added to the solution followed by heating of the solution to initiate the copolymerization. The second is a blow polymerization method wherein the copolymerization is performed while both formaldehyde and the cyclic ether are continuously blown into a solution of the catalyst in an inert organic solvent.

As the inert organic solvent used in the polymerization, any organic solvent which is inert to both formaldehyde and the cyclic ether at the copolymerization temperature can be used. It includes, for example, saturated aliphatic hydrocarbons such as n-hexane, n-heptane, etc.; alicyclic hydrocarbons such as cyclohexane, cyclopentane, etc.; aromatic hydrocarbons such as benzene, toluene, tetraline, etc.; and halogenated hydrocarbons such as chloroform, carbon tetrachloride, etc., and mixtures thereof.

The copolymerization temperature is in general —20° C. to 120° C. and preferably 40 to 100° C. In general, the copolymerization is carried out until the concentration of copolymer in the resulting slurry reaches 30 to 150 g. per liter of the inert organic solvent.

Thus, in accordance with the present invention, a formaldehyde copolymer having a molecular weight sufficient for practical use, an improved thermal stability and a base stability of no less than 95% is obtainable with a high efficiency, as exemplified in the following examples. This formaldehyde copolymer can be formed into a shaped article by a suitable shaping technique such as extrusion, injection, etc.

The following examples are given to illustrate the present invention and are not to be considered as limiting in any sense.

In these examples, the intrinsic viscosity [η] of the copolymer was determined on a solution of the polymer dissolved in p-chlorophenol containing 2% by weight of α-pinene, at 60° C. using a Cannon-Fenske viscosimeter.

$K_{222}$ means the rate constant of thermal degradation of the copolymer in an atmosphere of nitrogen at 222° C. and is defined by the following formula:

$$K_{222} = \frac{2.303}{t} \log \frac{W_o}{W} \times 100 \text{ (in percent per minute)}$$

wherein $W_o$ and $W$ are the weight of a specimen copolymer before measurement and after $t$ minutes from the initiation of measurement, respectively.

Further, base stability is determined as follows:

Approximately 5 g. of a specimen copolymer is precisely weighed in the balance. The copolymer and 50 ml. of benzyl alcohol containing 1% of triethylamine are charged into a 200 ml. round bottom flask, followed by heating at 160° C. for 2 hours. After cooling the copolymer solution, the copolymer coagulated is filtered out, washed with acetone and then dried. The dry copolymer is also precisely weighed. Base stability is defined as the proportion by weight of the dry copolymer to the initial copolymer and expressed in percent.

EXAMPLE 1

There were charged 2.5 l. of toluene and 125 g. of 1,3-dioxolan into a reactor followed by cooling to —78° C. Formaldehyde gas produced by the thermal decomposition of α-polyoxymethylene was passed through U-shaped tubes maintained at —15° C. for purification and blown into the solution in the reactor until 250 g. of formaldehyde was dissolved therein. After the temperature of the formaldehyde solution was raised to 0° C., a reaction mixture prepared by introducing 0.25 mmole of tris(acetylacetone)cobalt and 2.5 mmoles of boron trifluoride diethyl etherate into 47 ml. of toluene and reacting the two compounds with each other at room temperature for 24 hours was added to the formaldehyde solution to initiate the copolymerization. The temperature of the copolymerization system was raised to 60° C. over a period of 20 minutes from the addition of the catalyst and then maintained at 60° C. for 100 minutes. After a 10% solution of triethylamine in 20 ml. of methanol was added to the copolymerization system to terminate the copolymerization, a copolymer so produced was filtered out, washed repeatedly with acetone and then, dried at 60° C. under reduced pressure for 10 hours.

The copolymer having a melting point of 165° C., a base stability of 98%, an intrinsic viscosity [η] of 1.51 and a rate constant of thermal degradation $K_{222}$ of 0.01% per minute was obtained with a yield of 245 g.

EXAMPLE 2

The procedure of Example 1 was repeated wherein 125 g. of diethylene glycol formal was used in substitution for 1,3-dioxolan and the copolymerization was performed at 100° C. in substitution for 60° C. (the temperature of the formaldehyde catalyst solution was raised to 100° C. over a period of 20 minutes from the addition of the catalyst) with all other conditions remaining the same.

The copolymer having a melting point of 166° C., a base stability of 99%, an intrinsic viscosity [η] of 1.73 and a rate constant of thermal degradation $K_{222}$ of 0.02% per minute was obtained with a yield of 243 g.

EXAMPLES 3–22

The procedure of Example 1 was repeated wherein the combination of a metal chelate compound and a Lewis acid and the copolymerization temperature were varied as shown in Table III with all other conditions remaining the same. In these examples, the amounts of a metal chelate compound and Lewis acid used were 0.25 mmole and 2.5 mmoles, respectively, except that the amounts of a metal chelate compound used in Example 21 was 0.025 mmole.

Results are shown in Table III.

TABLE III

| Example number | Metal chelate compound | Lewis acid | Copolymerization temperature (°)[1] | Copolymer Yield (g.) | Melting point (° C.) | [η] | Base stability, percent | K₂₂₂ (percent/min.) |
|---|---|---|---|---|---|---|---|---|
| 3 | Tris(acetylacetone)iron | Boron trifluoride diethyl etherate | 100 | 246 | 165 | 1.53 | 98 | 0.02 |
| 4 | Bis(acetylacetone)nickel | do | 100 | 245 | 165 | 1.47 | 99 | 0.01 |
| 5 | Bis(acetylacetone)copper | do | 100 | 247 | 166 | 1.27 | 96 | 0.01 |
| 6 | Tetrakis(acetylacetone)thorium | do | 100 | 247 | 166 | 1.76 | 96 | 0.02 |
| 7 | Bis(monothioacetylacetone)copper | do | 80 | 249 | 166 | 1.53 | 99 | 0.02 |
| 8 | Bis(3-phenylacetylacetone)cobalt | do | 60 | 243 | 166 | 1.43 | 98 | 0.02 |
| 9 | Bis(bissalicylaldehydeethylenediimine)-cobalt | do | 60 | 241 | 165 | 1.47 | 97 | 0.01 |
| 10 | Bis(8-oxyquinoline)copper | do | 60 | 245 | 166 | 1.53 | 98 | 0.02 |
| 11 | Nickel glyoxime | do | 60 | 244 | 166 | 1.76 | 96 | 0.01 |
| 12 | Tris(acetylacetone)cobalt | Boron trifluoride tetrahydrofuranate | 60 | 247 | 166 | 1.53 | 96 | 0.01 |
| 13 | do | Boron trifluoride phenolate | 60 | 248 | 166 | 1.53 | 97 | 0.02 |
| 14 | do | Boron trifluoride | 60 | 241 | 165 | 1.47 | 98 | 0.01 |
| 15 | do | Tin tetrachloride | 80 | 240 | 166 | 1.46 | 96 | 0.01 |
| 16 | do | Titanium tetrachloride | 80 | 242 | 166 | 1.45 | 97 | 0.02 |
| 17 | Tetrakis(acetylacetone)thorium | Tin tetrachloride | 80 | 243 | 167 | 1.37 | 96 | 0.02 |
| 18 | Bis(3-anisacetylacetone)zinc | Boron tetrafluoride triethyloxonium | 80 | 250 | 165 | 1.55 | 98 | 0.02 |
| 19 | Bis(acetylacetone)magnesium | Boron trifluoride diethyl etherate | 60 | 245 | 165 | 1.53 | 98 | 0.02 |
| 20 | Tris(acetylacetone)aluminum | do | 60 | 248 | 167 | 1.67 | 99 | 0.01 |
| 21 | Bis(3-phenylacetylacetone)copper | do | 60 | 250 | 165 | 1.78 | 99 | 0.01 |
| 22 | Bis(3-methylacetylacetone)copper | do | 60 | 245 | 165 | 1.63 | 98 | 0.02 |

[1] The temperature of the copolymerization system was raised to the stated temperature over a period of 20 minutes from the addition of the catalyst.

EXAMPLE 23

The procedure of Example 1 was repeated wherein 125 g. of propylene oxide was used in place of 1,3-dioxolan with all other conditions remaining the same.

The copolymer having a melting point of 166° C., an intrinsic viscosity [η] of 1.46, a base stability of 96% and a rate constant of thermal degradation $K_{222}$ of 0.01% per minute was obtained with a yield of 242 g.

EXAMPLE 24

The procedure of Example 1 was repeated wherein the catalyst was substituted by a reaction mixture which was prepared by introducing 0.25 mmole of tris(acetylacetone)cobalt, 2.5 mmoles of boron trifluoride and 0.23 g. of acetic acid anhydride into 47 ml. of toluene and reacting these compounds with each other at room temperature for 24 hours, with all other conditions remaining the same. In the preparation of the catalyst, no precipitate formation was observed throughout the reaction.

The copolymer having a melting point of 166° C., an intrinsic viscosity [η] of 1.65, a base stability of 99% and a rate constant of thermal degradation $K_{222}$ of 0.01% per minute was obtained with a yield of 246 g.

EXAMPLE 25

There was charged 5.0 l. of cyclohexane into a 10 l. four neck separable flask followed by the addition of 100 g. of 1,3-dioxolan while being stirred at 60° C. Two dropping funnels, one of which was charged with a reaction mixture prepared by introducing 0.05 mmole of bis-(3-phenylacetylacetone)cobalt and 5.0 mmoles of boron trifluoride diethyl etherate into 120 ml. of toluene and reacting the two compounds with each other at room temperature for 24 hours and other of which was charged with a solution of 24 g. 1,3-dioxolan dissolved in 240 ml. of cyclohexane, were attached to the first and second necks of the separable flask, respectively.

Formaldehyde gas containing a water of 0.8% by weight produced by the thermal decomposition of polyethylene glycol hemiformal containing 20% by weight of formaldehyde at a temperature of 170° C. was continuously introduced through the third neck of the separable flask into the 1,3-dioxolancyclohexane solution at a flow rate of 2 g./min. At the same time, the 1,3-dioxolan solution was continuously introduced through the second neck into the reaction solution in the flask at a flow rate of 2 ml./min. and the catalyst solution was introduced through the first neck into the reaction solution.

At the time when the catalyst solution was introduced, the copolymerization was initiated and the copolymer began to disperse in the form of finely divided white particles in the reaction solution. The copolymerization was continued for 2 hours with the temperature being maintained at 60° C. After a 10% solution of triethylamine in 20 ml. of methanol was added to the copolymerization system to terminate the copolymerization, a copolymer so produced was filtered out, washed 3 times with 5 l. of methanol and then, dried at 80° C. under reduced pressure for 4 hours.

The copolymer so produced having a melting point of 165° C., an intrinsic viscosity [η] of 1.40 and a base stability of 99.5% was obtained with a yield of 235 g.

The copolymer was shaped by an extruder into chips of 1.5 mm. diameter and 3 mm. length. The chips were pure white and had a rate constant of thermal degradation $K_{222}$ of 0.02% per minute.

COMPARATIVE EXAMPLE 1

The procedure of Example 1 was repeated wherein the amounts shown in Table IV of boron trifluoride diethyl etherate were used as a catalyst in substitution for the reaction mixture of tris(acetylacetone)cobalt and boron trifluoride diethyl etherate with all other conditions remaining the same.

Results are shown in Table IV.

TABLE IV

| Number | Amount of boron trifluoride diethyl etherate used (mmole) | Copolymer Yield (g.) | Melting point (° C.) | [η] | Base stability, percent | K₂₂₂ (percent/min.) |
|---|---|---|---|---|---|---|
| 1 | 0.5 | 120 | 165 | 0.45 | 53 | 0.38 |
| 2 | 2.5 | 220 | 166 | 0.43 | 75 | 0.28 |
| 3 | 12.3 | 142 | 166 | 0.37 | 80 | 0.23 |

As apparent from Table IV, a boron trifluoride diethyl etherate catalyst results in the copolymer having a low intrinsic viscosity [η] and a low base stability and therefore, is unsuitable for practical use.

COMPARATIVE EXAMPLE 2

The procedure of Example 1 was repeated wherein the amounts shown in Table V of tris(acetylacetone)cobalt were used as a catalyst in substitution for the reaction mixture of tris(acetylacetone)cobalt and boron trifluoride diethyl etherate with all other conditions remaining the same.

Results are shown in Table V.

TABLE V

| Number | Amount of tris (acetyl-acetone) cobalt used (mmole) | Copolymer | | | | |
|---|---|---|---|---|---|---|
| | | Yield (g.) | Melting point (° C.) | [η] | Base stability, percent | K₂₂₂ (percent min.) |
| 1 | 0.05 | 245 | 176 | 2.4 | 0 | 1.3 |
| 2 | 0.25 | 247 | 178 | 7.8 | 0 | 1.1 |
| 3 | 1.25 | 249 | 178 | 7.1 | 0 | 1.1 |

As apparent from Table V, a tris(acetylacetone)cobalt catalyst results in the copolymer exhibiting a base stability of zero and is readily degradated to monomers.

COMPARATIVE EXAMPLE 3

The procedure of Example 1 was repeated wherein 0.25 mmole of tris(acetylacetone)cobalt and 2.5 mmoles of boron trifluoride diethyl etherate were separately introduced into the reaction solution as catalyst without previously reacting the two ingredients with each other before the introduction with all other conditions remaining the same.

The copolymer having a melting point of 168° C., an intrinsic viscosity [η] of 0.65, a base stability of 70% and a rate constant of thermal degradation K$_{222}$ of 0.25% per minute was obtained with a yield of 240 g. As apparent from this result, even in the case where both a metal chelate compound and a Lewis acid are employed as catalyst, when the two ingredients are separately introduced, only such a copolymer is obtainable which has remarkably low intrinsic viscosity [η] and base stability and therefore is unsuitable for practical use.

What we claim is:

1. A process for producing a formaldehyde copolymer which comprises copolymerizing substantially high molecular weight anhydrous formaldehyde with a cyclic ether of the formula:

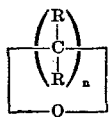

(I)

wherein the R's are identical with or different from each other and selected from the group consisting of a hydrogen atom, an alkyl group having 1 to 3 carbon atoms, an alkenyl group having 2 to 3 carbon atoms and an aryl group having 6 to 8 carbon atoms and $n$ is an integer of 2 to 6, or a cyclic ether of the formula:

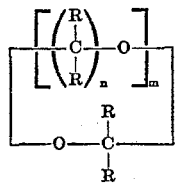

(II)

wherein the R's are identical with or different from each other and the same as R defined above in Formula I and $n$ and $m$ are integers of 2 to 6 and 1 to 3, respectively, in an inert organic solvent in the presence of a reaction mixture prepared by reacting a metal chelate compound with Lewis acid at a molar ratio of 1:2–1:20 in the case of the metal chelate compound being other than bis(3-phenylacetylacetone) copper or 1:2–1:2000 in the case of the metal chelate compound being bis(3-phenylacetylacetone) copper, said metal chelate compound consisting of (a) a metal, as a central atom, selected from metals of Group I, II and III of the Periodic Table and transition metals and (b) ligand selected from β-diketone, thio-β-diketone, aromatic hydroxyaldehyde, a condensation product between aromatic hydroxyaldehyde and diamine, dibasic acid, amino acid, oxime, 8-hydroxyquinoline and ethylenediaminetetraacetic acid, and said Lewis acid being selected from boron trifluoride, metal halide, boron trifluoride ether complex, boron trifluoride ester complex, boron trifluoride ketone complex, boron trifluoride acid anhydride complex, boron trifluoride alcohol complex, boron trifluoride phenol complex, boron trifluoride organic acid complex and boron tetrafluoride alkyl oxonium compound.

2. A process as claimed in claim 1 wherein said reaction mixture is prepared by reacting said metal chelate compound and said Lewis acid with each other in the presence of 4 to 100 moles of acetic acid anhydride per mole of said metal chelate compound.

3. A process as claimed in claim 1 wherein said reaction mixture is prepared by reacting said metal chelate compound and said Lewis acid with each other in at least one organic solvent selected from a saturated hydrocarbon, an aromatic hydrocarbon, an alicyclic hydrocarbon, a halogenated hydrocarbon and an ether at a temperature of 0° C. to a boiling point of said organic solvent.

4. A process as claimed in claim 1 wherein said reaction mixture between the metal chelate compound and the Lewis acid is present in an amount such that the amount of the Lewis acid is 0.1 to 2.0 mmoles, and the amount of the metal chelate compound is 0.02 to 0.25 mmole in the case of the metal chelate compound being other than bis(3-phenylacetylacetone)copper and 0.0002 to 0.25 mmole in the case of the metal chelate compound being bis(3-phenylacetylacetone)copper, both per mole of formaldehyde.

5. A process as claimed in claim 1 wherein the amount of said cyclic ether is 0.001 to 1 mole per mole of formaldehyde.

6. A process as claimed in claim 1 wherein said cyclic ether is selected from 1,3-dioxolan, diethylene glycol formal, propylene oxide, ethylene oxide, oxetan, 4-phenyl-1,3-dioxane and 1,4-butanediol formal.

7. A process as claimed in claim 1 wherein said inert organic solvent is at least one selected from aliphatic, alicyclic and aromatic hydrocarbons and halogenated hydrocarbons.

8. A process as claimed in claim 1 wherein said copolymerization is carried out at a temperature of −20° to 120° C.

9. A process as claimed in claim 1 wherein said copolymerization is carried out until the concentration of copolymer in the resulting slurry reaches the range of 30 to 150 g. per liter of said inert organic solvent.

References Cited

UNITED STATES PATENTS

| 3,267,076 | 8/1966 | Ishii et al. | 260—67 FP |
| 3,305,529 | 2/1967 | Reynolds | 260—67 FP |
| 3,639,347 | 2/1972 | Sugiura et al. | 260—67 FP |

LUCILLE M. PHYNES, Primary Examiner